(12) United States Patent
Litwin

(10) Patent No.: US 7,011,086 B2
(45) Date of Patent: Mar. 14, 2006

(54) BOTTOM SUPPORTED SOLAR RECEIVER PANEL APPARATUS AND METHOD

(75) Inventor: Robert Zachary Litwin, Canoga Park, CA (US)

(73) Assignee: The Boeing Company, Chicago, IL (US)

( * ) Notice: Subject to any disclaimer, the term of this patent is extended or adjusted under 35 U.S.C. 154(b) by 503 days.

(21) Appl. No.: 10/310,320

(22) Filed: Dec. 5, 2002

(65) Prior Publication Data

US 2004/0108099 A1 Jun. 10, 2004

(51) Int. Cl.
*F24J 2/24* (2006.01)

(52) U.S. Cl. .................. 126/651; 126/655; 165/82; 165/67

(58) Field of Classification Search ............ 126/651 O, 126/655, 704; 165/82, 67
See application file for complete search history.

(56) References Cited

U.S. PATENT DOCUMENTS 2,703,559 A * 3/1955 Godshalk .................. 122/6 A
4,244,350 A * 1/1981 Chubb ....................... 126/400
4,653,470 A * 3/1987 Carli et al. ................. 126/663
5,161,520 A * 11/1992 Pitt et al. ................... 126/638
5,482,233 A    1/1996 Marko et al.

* cited by examiner

*Primary Examiner*—Alfred Basichas
(74) *Attorney, Agent, or Firm*—Harness Dickey & Pierce P.L.C.

(57) ABSTRACT

A bottom supported solar receiver tube/header assembly having a bottom clip for supporting the entire load of a plurality of tubes carrying a heat absorbing fluid. The tubes are allowed to expand vertically upwardly under thermal flux conditions created when the fluid absorbs heat from the solar receiver panel. A receiver panel assembly incorporating a plurality of the bottom supported receiver tubes requires less piping than a comparably sized, conventional receiver panel assembly with top supported tubes and even better facilitates access and maintenance of valves associated with the receiver panel assembly. The invention further allows a solar receiver panel assembly to be constructed with significantly fewer drain and vent valves than previously developed, top supported receiver panel assemblies.

14 Claims, 4 Drawing Sheets

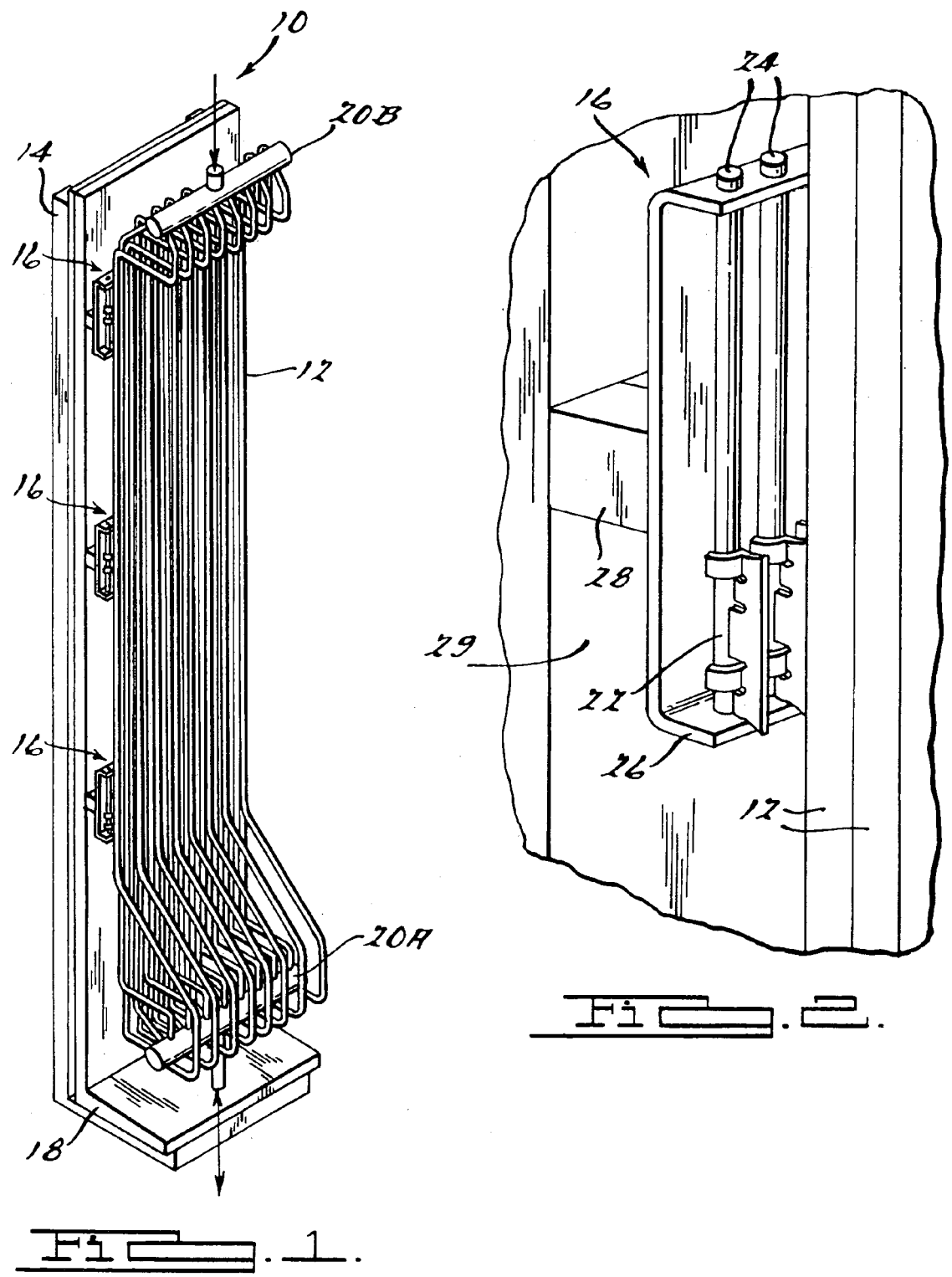

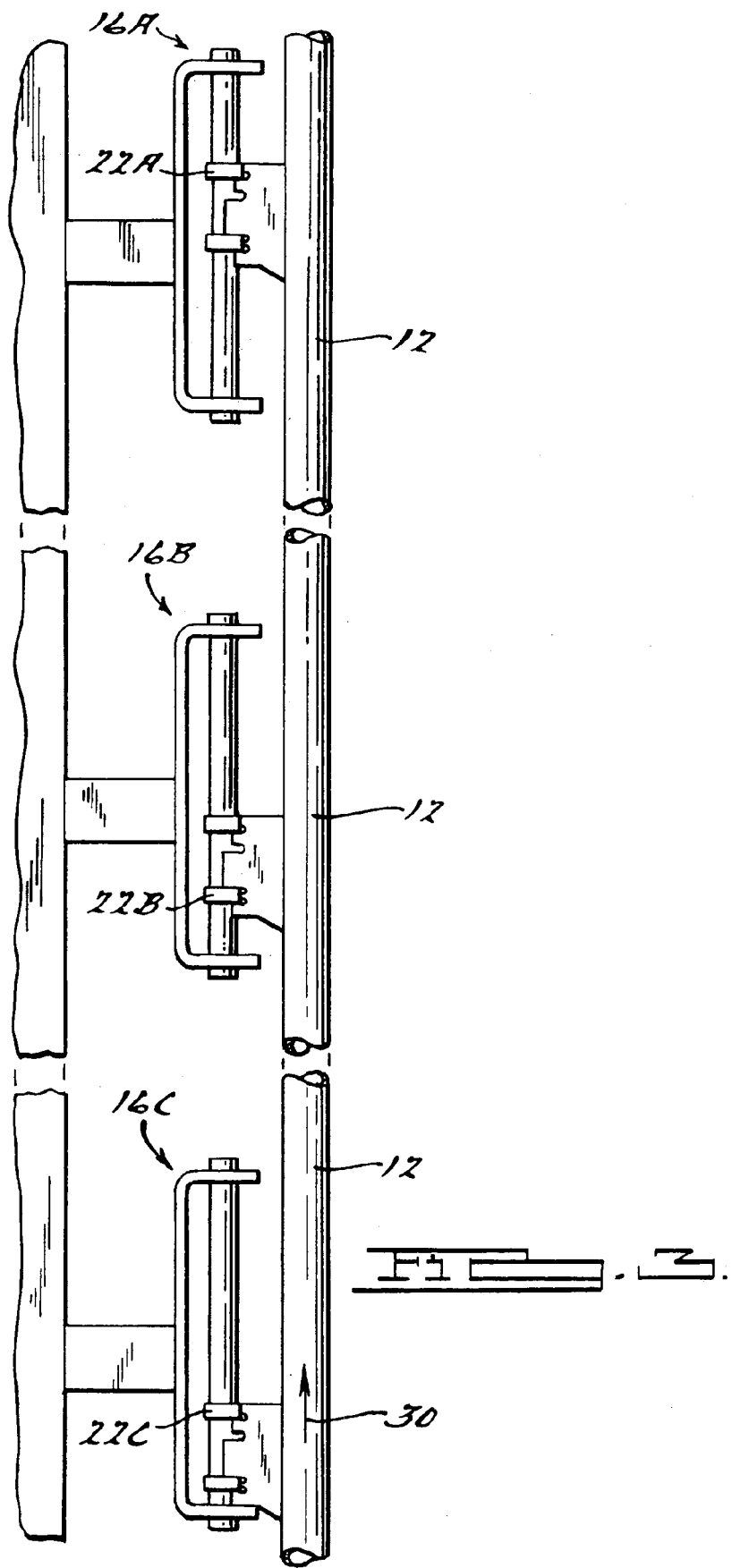

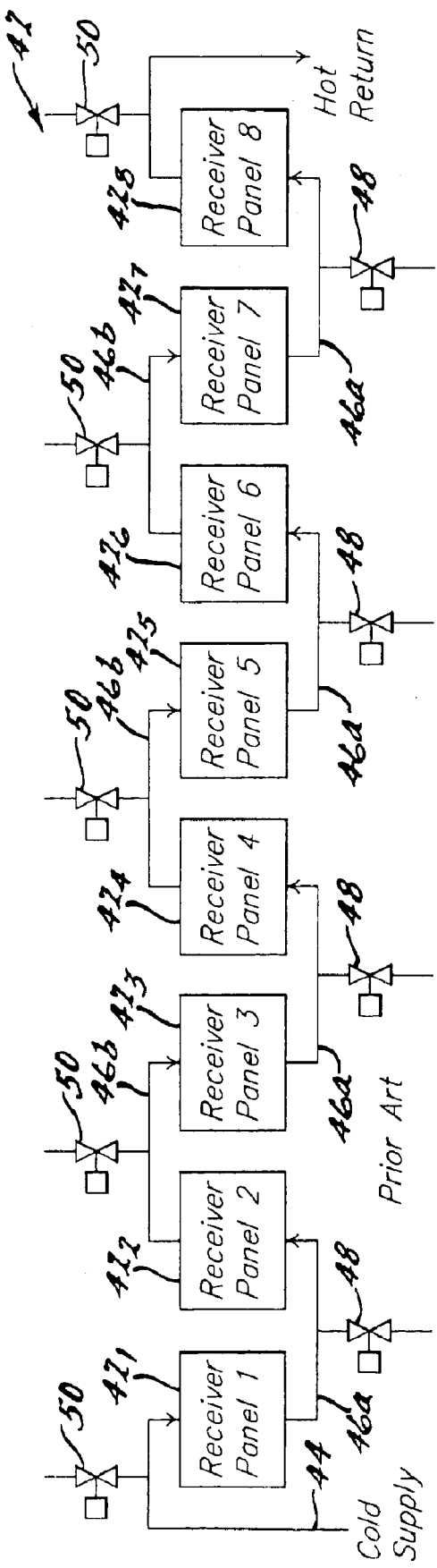
FIG. A. Prior Art
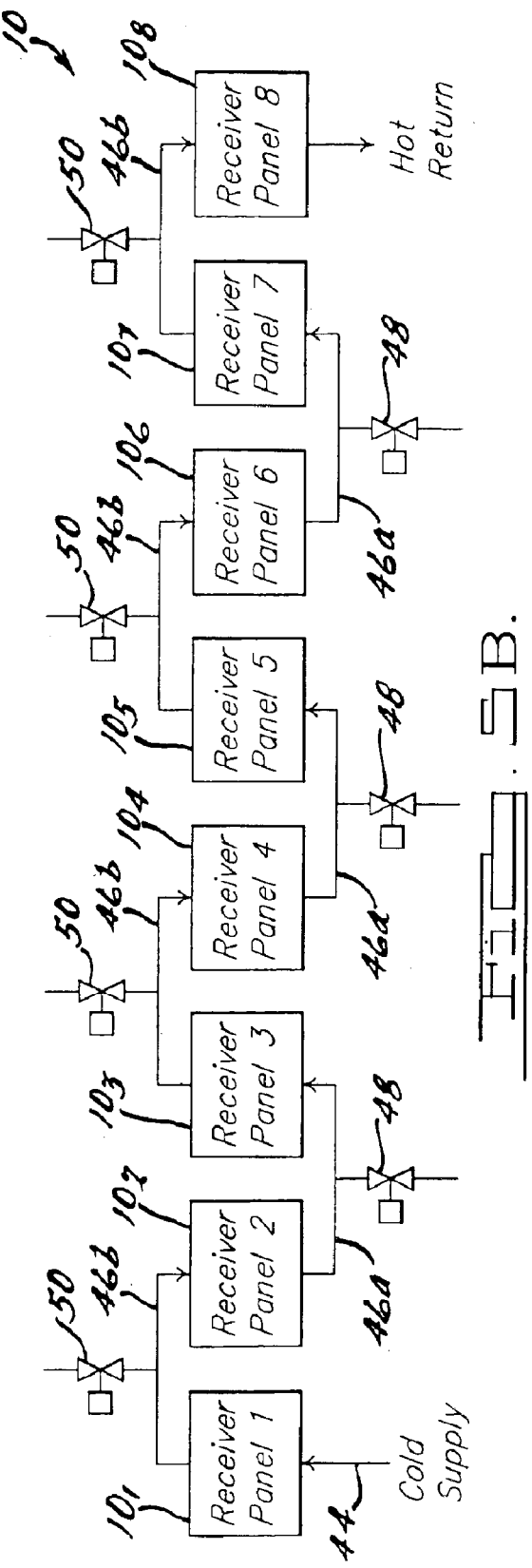
FIG. B.

BOTTOM SUPPORTED SOLAR RECEIVER PANEL APPARATUS AND METHOD

FIELD OF THE INVENTION

The present invention generally relates to solar receiver panels, and more particularly to bottom supported solar receiver panels that enable the upward thermal expansion of tubes attached to the solar receiver panels.

BACKGROUND OF THE INVENTION

In the backdrop of ever dwindling fossil fuel resources, researchers are exploring ways of harnessing alternate sources of energy. Solar energy is a promising alternate source of energy. Engineers are facing several challenges in capturing, storing and converting solar energy. The problem of converting solar energy into electricity in a cost-effective manner and on a large scale still poses challenges.

Several approaches are being followed to reach the goal of generating a large-scale and reliable flow of electricity from solar energy. One such method is through the use of a solar central receiver mounted on top of a tower. The solar receiver is basically a heat exchanger that absorbs concentrated solar energy. The receiver absorbs the sun's energy in a concentrated form from an array of mirrors called heliostats. The receiver comprises a number of panels. Mounted on the panels is a connected set of tubes carrying a heat absorbing fluid. The fluid inside the tubes traces a serpentine path from panel to panel when circulating inside the tubes. The receiver functions as a heat exchanger to transfer the solar energy received from the heliostats to the heat absorbing fluid carried by the tubes. For example, in one design molten salt is pumped up to the receiver and circulated inside the receiver panel tubes. The molten salt is heated by the solar energy absorbed by the receiver tubes. The heated molten salt flows into a ground based hot thermal storage tank(s). Hot molten salt is then pumped from the hot thermal storage tank as needed to create steam that powers a steam turbine for generating electricity.

Panels are comprised primarily of a strongback, insulation, receiver tubes, headers and tube guide/supports. Tubes are connected at the top and bottom of the panel by the headers. The tube-header assembly is connected to the guide/supports by clips. The guide/supports are rigidly attached (welded or bolted) to the strongback, which in turn is attached to the receiver tower super-structure. In known receiver designs, though multiple clips may be used to hold the tubes, it is the topmost clip which bears the vertical deadweight of the tubes and header assembly. Other clips along the tube length carry the horizontal and bowing loads on the tubes and also maintain the alignment of the tubes. Thus, the known receiver designs use a top supported panel design where the vertical load of each tube is carried solely by the topmost clip at an upper end of each tube.

The top supported receiver panel design, while having proven to be effective, could nevertheless be improved in several ways. Since the tubes are supported at the top, as the tubes thermally expand, they expand in a downward direction when thermal flux is applied. Top supported receiver panels generally also require relatively large cold supply and hot return pipelines for molten salt to be attached near the top of the receiver panel that is stationary during changes in temperature. Consequently, the top supported receiver panels all require relatively large pipelines to be run through the congested center of the cylindrical receiver and to the tops of the panels. This arrangement also requires lengthy pipe runs. Therefore, construction can often become complex due to the routing difficulties and lengthier pipes used within the cylindrical receiver. Even a flat billboard shape receiver requires long runs of large pipe if the panels are top supported.

SUMMARY OF THE INVENTION

The present invention relates to a solar receiver panel having bottom supported tubes that carry heat absorbing fluid. In a preferred embodiment, the tubes are attached to the receiver panels with clips spaced apart vertically along the lengths of the tubes. A bottommost clip of each tube carries the entire vertical weight of its associated tube and header assembly. The clips allow portions of the tubes to move up and down when the tubes undergo thermal expansion and contraction. The tubes undergo thermal expansion in a vertically upward direction when the thermal fluid (e.g., molten salt or others) inside the tubes is heated by absorbing heat from the receiver panels. The bottom supported receiver panel reduces the lengths of piping required, as well as the routing complexity of the piping, within the receiver. Further, the number of valves required in comparison to the top supported receiver can be reduced. Further, the valves can be placed at a convenient location, for example, on the deck of the receiver for easy maintenance. The individual receiver panels are connected by jumper lines. Jumper lines connecting the bottoms of adjacent panels typically have drain valves located on each servicing two receiver panels. Similarly, jumper lines connecting the top of adjacent panels have vent valves. The bottom supported receiver requires a fewer number of vent and drain valves as compared to a top supported receiver.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a perspective view of a solar absorption panel in accordance with a preferred embodiment of the present invention;

FIG. 2 shows a perspective view of a clip assembly used with the receiver;

FIG. 3 shows a cross section of the clip arrangement of the present invention in a representative form;

FIG. 5A shows the drain valve arrangement in a conventional, top supported receiver; and FIG. 5B shows the drain valve arrangement for the bottom supported receiver panel of the present invention.

DETAILED DESCRIPTION OF THE PREFERRED EMBODIMENTS

Figure 4A:
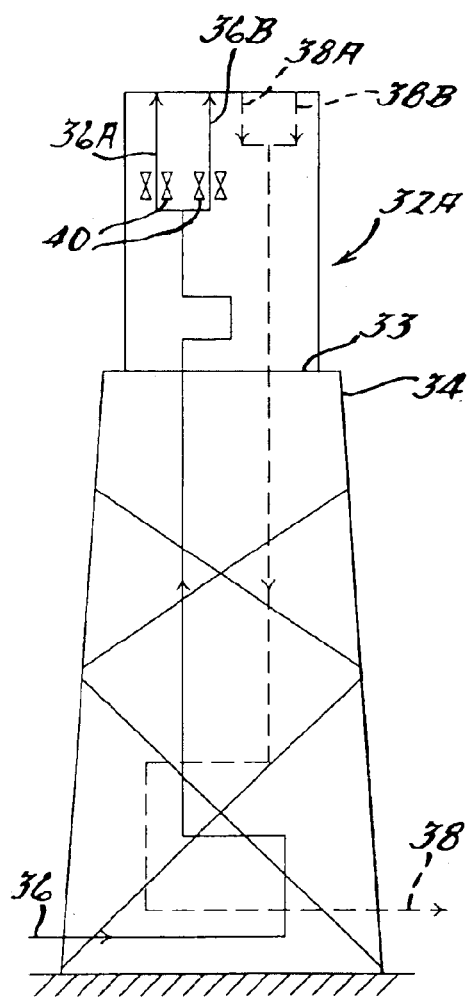
FIG. 4A shows a prior art receiver constructed using top supported receiver panels.

The following description of the preferred embodiment(s) is merely exemplary in nature and is in no way intended to limit the invention, its application, or uses.

Initially, a general description of the construction and operation of a solar power tower will be provided. A solar power tower is used to collect solar thermal energy and convert it into electricity. A large number of sun-tracking mirrors called heliostats collect the solar energy. The collected solar energy from the heliostats is redirected and concentrated onto a solar receiver mounted on top of the solar power tower. The solar receiver can be constructed by various methods. The present invention is adapted for a solar receiver that functions as a heat exchanger. The receiver functioning as a heat exchanger transfers the concentrated solar energy redirected from the heliostats to a fluid circulated through a piping system inside the receiver.

The fluid inside the receiver functions as an energy transfer medium. The fluid is preferably a molten salt coolant, but the present invention is not limited to use with specific type of fluid. Molten salt is used only for explanatory purposes in the following description. A first set of ground based cold thermal tank(s) store the molten salt coolant at around 550° F. (287° C.). A pump(s) is used to transfer the molten salt from the cold thermal storage tank to the receiver located on top of the solar power tower. The molten salt is heated up to around 1050° F. (565° C.) as the fluid circulates through the receiver panels in a serpentine manner.

The heated molten salt then exits the receiver through a down comer hot return pipe and flows into ground based hot thermal storage tank(s). The stored hot salt in the hot thermal tank(s) is drawn out as needed to generate steam to power a steam turbine. The steam turns the turbine which is connected to a generator to produce electricity, for example, via a standard Rankine cycle. The receiver panels are described next in detail.

Referring now to FIG. 1, an absorption panel 10 in accordance with a preferred embodiment of the present invention is shown. A solar receiver typically comprises a plurality of the solar absorption panels 10 positioned adjacent one another. There are several arrangements of panels, the most common of which forms either a cylindrical shape receiver or a flat "billboard" shape receiver. Each panel 10 comprises a plurality of solar absorption tubes 12. A plurality of independent clip guide/support assemblies 16 secure tubes 12 to a panel strongback structure 14. Typically, each clip guide/support assembly 16 is welded to the panel strongback structure 14. Insulation 18 thermally isolates the tubes 12 from the panel strongback structure 14. Insulation 18 is provided behind absorption tubes 12 and in front of the panel strongback structure 14. As will be explained in greater detail in the following paragraphs, the fluid first enters through header 20A at the bottom of panel 1.

FIG. 2 shows an enlarged view of the clip 22 and guide/support assembly 16. The clip 22 and guide/support assembly 16 consists of slidable clips 22 disposed on guide rods 24. The guide rods 24 are fixed on a bracket 26 in parallel, spaced apart in relation to one another. The bracket 26 is joined to a strongback structure 29 of the panel 10 by a support 28 member.

Tubes 12 are each firmly welded to the slidable clips 22. Molten salt inside the tubes 12 is heated as it absorbs the thermal energy collected by the receiver. The heated molten salt causes the tubes to undergo thermal expansion. The clip 22 and guide/support assembly 16 is designed to allow unrestrained axial expansion of the tubes 12 along the Y-axis (i.e., vertically), or rather along the length of the tubes 12 from the bottoms toward the tops. Clip 22 and guide/support assembly 16 effectively restrains any bowing or motion of the tubes 12 in either the X-axis or the Z-axis of a given plane.

FIG. 3 shows a side view portion of the solar panel receiver 10 of the present invention incorporating a plurality of supporting clips 22 and guide/support assemblies 16. The clip 22A and guide/support assembly 16A is the topmost clip 22 and guide/support assembly 16 of a given panel 10 (shown in FIG. 1). The middle clip 22B and guide/support assembly 16B is positioned between the topmost clip 22A and guide/support assembly 16A and a bottom clip 22C and guide/support assembly 16C. It will be appreciated that the panel 10 may include additional clip 22 and guide/support assemblies 16, depending on the overall length of the panel 10. Nevertheless, the vertical load of the tube 12 and header 20A/20B assembly is carried entirely by the bottom clip 22C and guide/support 16C, while any additional clips 22 along the vertical length of the tube 12 restrain the tubes 12 from bowing in the other two normal directions along the X and Z axis. Hence, the tubes 12 are allowed to thermally expand upward in relation to the bottom clip 22C and guide/support assembly 16C. The unidirectional arrow 30 indicates the direction of thermal expansion of tube 12.

Figure 4B:
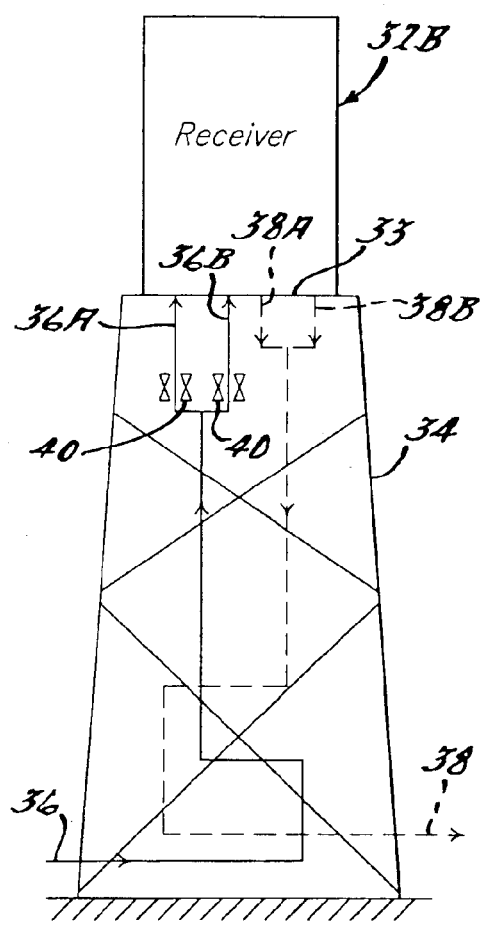
FIG. 4B shows the reduced piping requirements of the bottom supported solar receiver of the present invention.

FIG. 4A shows a prior art receiver 32A constructed using top supported receiver panels. FIG. 4B shows a receiver 32B constructed using the bottom supported receiver panels of the present invention, and highlights the reduced piping requirements of the bottom supported solar receiver. The top supported receiver 32A uses a relatively complex routing of internal pipes since the hot molten salt is supplied to, and collected from, the top of the receiver. To further complicate pipe routing, the supply riser 36 is typically split into two supply lines 36a and 36B that supply two parallel flow circuits through the receiver. Similarly, two return lines 38A and 38B exit each of these circuits before being combined into a single return downcomer 38. In the top supported receiver 32A, a cold salt riser pipe 36 and a hot salt down comer pipe 38 have to extend well up into the receiver to be able to connect to the first and last panels within the receiver.

The cold salt riser pipe 36 and the hot salt down comer pipe 38 have relatively large dimensions because they are used to transport a large quantity of salt to and from the receiver 32A. Accommodating large dimensioned pipes in the receiver 32A requires either a physically larger receiver or much more complex and congested piping, both of which complicate and increase construction cost. Further, cold salt control valves 40 for the cold salt riser pipe 36 also are typically positioned within the receiver panels. Thus, the relatively complex piping and valving needed within a receiver having top supported tubes can significantly increase the overall cost of constructing the receiver.

With the present invention, a bottom supported receiver assembly 32B of FIG. 4B, which includes one or more receiver panels 10, simplifies the piping required within the receiver assembly by enabling a substantial degree of the piping to be included within the tower 34. Space is limited within the receiver assembly 32B, but the tower 34 typically has a significantly greater internal area to accommodate the cold salt riser pipe 36 and supply lines 36A and 36B and the hot salt down comer pipe 38 and return lines 38A and 38B. For the bottom supported receiver panels 10 of the present invention, the hot and cold salt pipelines need to be routed only to a deck 33 of the receiver 32B. This arrangement saves a significant length of pipe. In one instance, the savings has been found to be several hundred feet of hot and cold salt piping. Further, the movement and loads of the hot salt down comer pipe 38 are significantly reduced, leading to a less complex interface between the receiver assembly 32B and the hot down comer pipe 38. Hence, it will be appreciated that it is desirable, both from a cost standpoint and an overall system complexity standpoint, to have the piping 36, 36A, 36B, 38, 38A, 38B contained within the tower 34 as much as possible rather than in the receiver assembly 32B.

As should be clear from FIG. 4B, for the bottom supported receiver panels 10 used in the receiver panel assembly 32B, the cold salt riser pipe 36 does not need to be routed within the receiver panel assembly 32B up to the top area of the panel thereof; it only needs to be connected near the bottom of the receiver panel assembly 32B, and preferably placed near the deck 33. Similar simplification is achieved for the hot salt down comer pipe 38. Bottom supported receiver panel 10 allows placement of the cold salt control valves 40 on or below the deck 33 of the receiver 32B. Such an arrangement of salt control valves 40 further facilitates access and maintenance.

FIG. 5A shows the drain and vent valve arrangement in a top supported, prior art receiver 42. Purely for illustration purposes, the receiver 42 is shown as having eight receiver panels $42_1$–$42_8$. The fluid enters the chain of connected receiver panels $42_1$–$42_8$ from an input conduit 44. The panels are interconnected by means of jumper lines 46a and 46b. The low level jumper lines 46a have drain valves 48 for draining the fluid. The drain valves 48 are normally closed during operation and are opened only when the receiver is drained or filled. Similarly, vent valves 50 are shown that are normally closed during operation and are opened only when the receiver is drained or filled.

FIG. 5B shows a drain and vent valve arrangement for a plurality of bottom supported receiver panels 10 of the present invention. As shown, the bottom supported receiver panels 10 require fewer drain and vent valves 48 and 50, respectively, in comparison to the drain and fill valves required by the top supported receiver panel assembly 42 illustrated in FIG. 5A. Both examples use the same number of receiver panels, i.e., eight independent panels, with FIG. 5B denoting the receiver panels via reference numerals $10_1$–$10_8$. Hence, the bottom supported receiver panels $10_1$–$10_8$ require fewer drain and vent valves 48 and 50 respectively than the top supported receiver panel assembly 42.

It will be appreciated then that the bottom supported receiver panels 10 have several advantages over the top supported receiver panels. A solar panel system constructed using the bottom supported receiver panels 10 requires less piping and a reduced number of drain and vent valves that help to lower the overall cost of a solar panel system. Further, the placement of flow control valves on or below the receiver deck 33 permits easy access and maintenance of the valves and pipes. Such positioning of the valves also can reduce the complexity of the piping inside the receiver panel assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bottom supported solar receiver panel apparatus comprising:
at least one solar receiver panel for receiving solar energy, said solar receiver panel including a bottom portion and a top portion;
a plurality of vertically aligned tubes connected to a first header proximate said top portion and a second header proximate said bottom portion; and
at least one bottom clip joining each of said tubes to said bottom portion of said solar receiver panel, said bottom clip rigidly attached to said tubes between said first and said second headers, said bottom clip carrying an entire load of each of said tubes, such that the entire load of said tubes is supported between said first and said second headers;
wherein said clip includes a sliding mechanism to accommodate movement of said tubes.

2. The apparatus of claim 1, further comprising:
a fluid circulating within said tubes; and
wherein said tubes are able to expand vertically upward in relation to said bottom clip as said fluid absorbs heat from said solar receiver panel.

3. The apparatus of claim 2, wherein said bottom clip comprises:
at least one guide rod, said tubes being secured in two axes to said guide rod but free to move upward in the vertical axis.

4. The apparatus of claim 1, further comprising:
at least one other clip joining said tubes at a portion of said solar receiver panel other than at said bottom portion of said solar receiver panel, said other clip restraining said tubes from moving or towing in directions other than the vertical direction.

5. The apparatus of claim 1, further comprising:
at least one drain and one vent valve connected to said panels at a position adjacent said bottom and a top portion of said solar receiver panel, respectively.

6. The apparatus of claim 1, further comprising:
at least one first valve connecting a cold fluid supply pipe to said tubes; and
said first valve being positioned adjacent said bottom portion of said solar receiver panel.

7. The apparatus of claim 6, wherein said first valve is positioned adjacent said bottom portion of said solar panel for minimizing a length of said cold fluid supply pipe.

8. A solar receiver apparatus for absorbing heat from a fluid heated by solar energy, comprising:
a plurality of solar receiver panels, each of said solar receiver panels having a bottom portion and a top portion; and
at least one bottom clip joining said bottom portion of a given said solar receiver panel to a given sub-plurality of fluid conducting tubes connected to a first header proximate said bottom portion and a second header proximate said top portion, said bottom clip supporting an entire weight of said sub-plurality of said tubes at a point between said first and second headers;
said sub-plurality of said tubes being able to expand upwardly in relation to said bottom portion of their associated said solar receiver panel under thermal flux conditions;
said clip including a slidable sleeve and a linear guide rod that receives said slidable sleeve to accommodate expansion of said tubes and to maintain said tubes in the same vertical plane during expansion of said tubes.

9. The apparatus of claim 8, further comprising:
a support tower;
said solar receiver panels being mounted on top of said support tower;
at least one first valve connecting a cold fluid supply pipe to said fluid conducting tubes; and
said first valve being positioned adjacent said bottom portion of the receiver panel and adjacent a top end of said support tower.

10. The apparatus of claim 8, wherein said first valve is positioned adjacent said bottom portion, thereby minimizing a length of said cold fluid supply pipe.

11. The apparatus of claim 8, further comprising:
a cold fluid entry point located at a first end of said tubes and positioned close to said bottom portion, said cold fluid entry point joined to a first valve for receiving said fluid from a cold fluid supply pipe.

12. The apparatus of claim 8, further comprising:
a hot fluid exit point at a second end said tubes and positioned close to said bottom portion, said hot fluid exit point joined to a hot fluid exit pipe.

13. The apparatus of claim 8 wherein said solar receiver panels are joined by fluid carrying jumper lines.

14. A method of supporting a solar receiver panel, the method comprising the steps of:
securing a support clip to a plurality of solar receiver panel tubes having a first header at a first end of said tubes and a second header at a second end of said tubes, said support clip being attached at a bottom portion of said solar receiver panel, said support clip including a guide rod mounted to a bracket and a slidable sleeve mounted to said tubes;

supporting an entire weight of said solar receiver tubes with said support clip at a point between said first and second headers; and circulating a fluid inside said tubes, said tubes being allowed to thermally expand upwardly in relation to said bottom portion upon said fluid increasing in temperature and causing a resultant increase in a temperature of said tubes, said slidable sleeve slidable along said guide rod to accommodate expansion of said tubes and to maintain said tubes in the same vertical plane through the range of expansion.

* * * * *